(12) United States Patent
Kettler et al.

(10) Patent No.: US 8,454,045 B2
(45) Date of Patent: Jun. 4, 2013

(54) TRICYCLE WITH VARIABLE POSITION FOOT BOARDS

(75) Inventors: Joachim Kettler, Ense (DE); Karin Kettler, Ense (DE)

(73) Assignee: Heinz Kettler GmbH & Co. KG, Ense (DE)

( * ) Notice: Subject to any disclaimer, the term of this patent is extended or adjusted under 35 U.S.C. 154(b) by 23 days.

(21) Appl. No.: 12/987,287

(22) Filed: Jan. 10, 2011

(65) Prior Publication Data

US 2012/0007330 A1    Jan. 12, 2012

(30) Foreign Application Priority Data

Jul. 8, 2010 (EP) .................................. 1001729260

(51) Int. Cl.
*B62J 25/00* (2006.01)

(52) U.S. Cl.
USPC .............................. 280/291; 280/220; 74/564

(58) Field of Classification Search
USPC ............. 280/210, 220, 219, 291, 282; 74/564
See application file for complete search history.

(56) References Cited

U.S. PATENT DOCUMENTS

| 1,379,305 | A | * | 5/1921 | Johns ............................. 280/7.1 |
| 3,605,929 | A | * | 9/1971 | Rolland ........................ 180/208 |
| 4,079,957 | A | * | 3/1978 | Blease .......................... 280/278 |
| 4,159,752 | A | * | 7/1979 | Kanno ......................... 180/210 |
| 4,168,846 | A | * | 9/1979 | Carren ......................... 280/278 |
| 4,325,565 | A | * | 4/1982 | Winchell ...................... 280/282 |
| 4,457,529 | A | * | 7/1984 | Shamie et al. ................ 280/278 |
| 4,657,270 | A | * | 4/1987 | Allen et al. .................... 280/7.1 |
| 6,089,587 | A | * | 7/2000 | Li ................................. 280/291 |
| 6,161,847 | A | * | 12/2000 | Howell et al. .................. 280/30 |
| 6,685,207 | B1 | * | 2/2004 | Blake ........................... 280/282 |
| 7,455,308 | B2 | * | 11/2008 | Michelau et al. ............. 280/282 |
| 2003/0122346 | A1 | * | 7/2003 | Wu ............................... 280/291 |
| 2003/0201621 | A1 | * | 10/2003 | Jang ............................. 280/293 |
| 2004/0066018 | A1 | * | 4/2004 | Li ................................. 280/282 |
| 2005/0206114 | A1 | * | 9/2005 | Michelau ...................... 280/220 |

* cited by examiner

*Primary Examiner* — Paul N Dickson
*Assistant Examiner* — Maurice Williams
(74) *Attorney, Agent, or Firm* — Laurence A. Greenberg; Werner H. Stemer; Ralph E. Locher

(57) ABSTRACT

A tricycle has a frame, a front wheel with drive pedals, a seat, and a footboard. The footboard of the novel tricycle can optionally be mounted on the frame in a first orientation and in at least one second orientation.

14 Claims, 9 Drawing Sheets

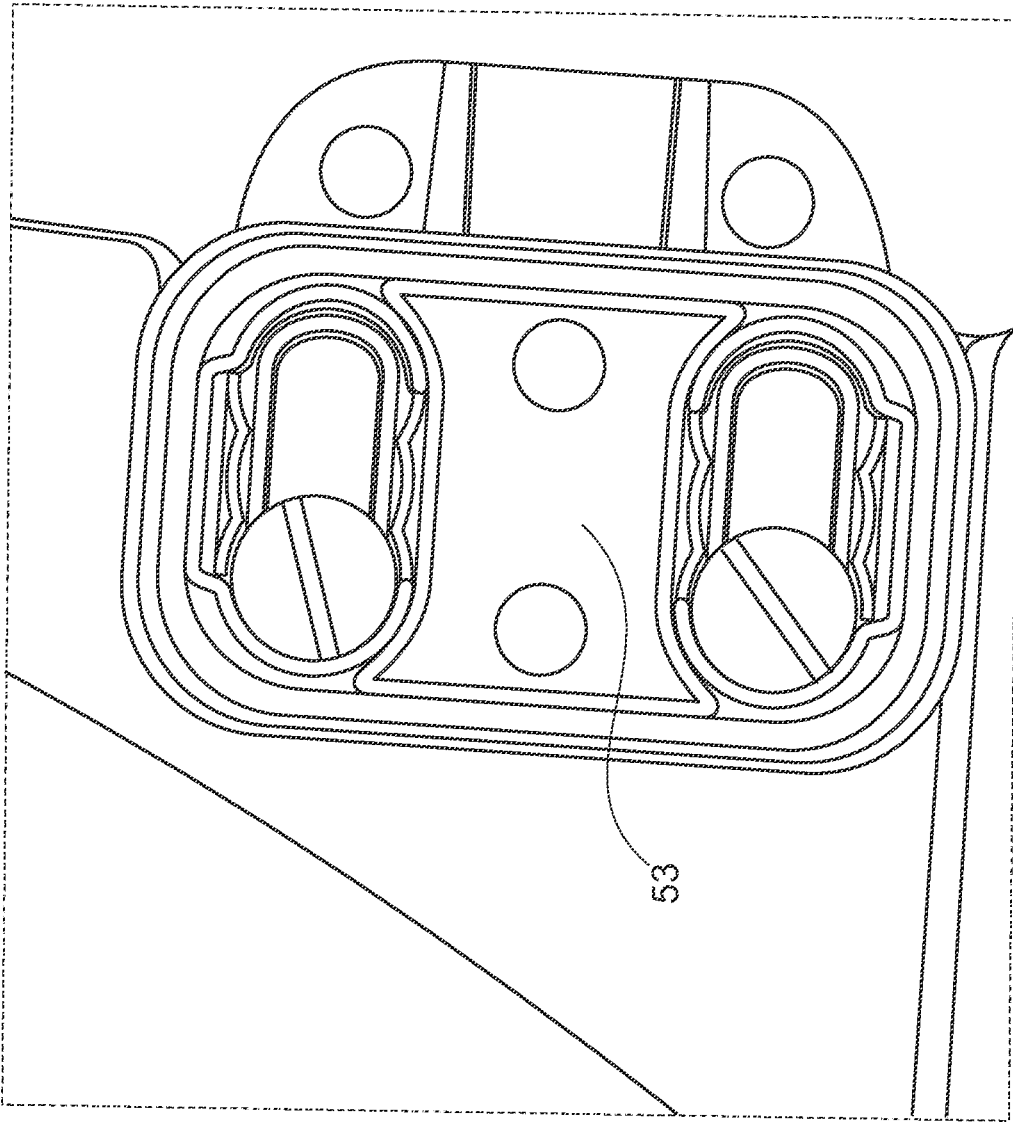

TRICYCLE WITH VARIABLE POSITION FOOT BOARDS

BACKGROUND OF THE INVENTION

Field of the Invention

The present invention relates to a tricycle with a frame, a front wheel with drive pedals, a seat, and a footboard.

Tricycles are well known. Essentially they comprise a frame, two rear wheels, a steerable front wheel with two drive pedals, and a seat attached to the frame. Furthermore, the tricycle can be equipped with a footboard.

The footboard gives a user sitting on the seat, usually a child, an opportunity to place his/her feet on the footboard. In this case, the tricycle should only be pushed, for example, because the child is too little or is already tired. When the footboard is removed, it is provided that the user operates the drive pedals him or herself.

A drawback in this context is that the footboard must be mounted or removed as necessary. Prior to its use, it has to be stored and is thus in danger of getting lost. Should the user want to operate the drive pedals in a proper manner, on the other hand, the footboard must be removed and put aside. The footboard is thus again in danger of getting lost or has to be stored.

BRIEF SUMMARY OF THE INVENTION

This is where the present invention comes in and has the object of providing an improved tricycle, in particular a tricycle which can be adapted to the individual requirements of the user with respect to drive pedal operation or push operation, where the footboard cannot get lost, however, and need not be stored either.

According to the present invention, this object is achieved by a tricycle as claimed. By providing that the footboard can be optionally attached in a first orientation and at least a second orientation on the frame, it is possible to adapt the footboard to each desired state of the tricycle. For example, in the first orientation, the footboard can be adapted for the user to place his or her feet on the footboard and be pushed. In the second orientation, for example, most of the footboard is no longer arranged below the seat, so that the user can choose to operate the pedals.

Further advantageous embodiments of the present invention can be derived, in particular, from the features of the dependent claims. The features of the dependent claims can be basically combined in any desired manner.

In an advantageous embodiment of the invention, it can be provided that the footboard has a narrower portion and a broader portion in the longitudinal direction. Such a footboard is particularly suitable for the purpose envisaged, since the broad portion, in the second orientation of the footboard, is displaced to an area behind the seat in the direction of the rear wheels, where it is not an obstruction, but where it at least gives the user complete and free access to the drive pedals.

In a further advantageous embodiment of the invention, it can be provided that the broader portion of the footboard, in a first orientation, faces the drive pedals, whereby the narrower portion of the footboard, in a second orientation, faces the drive pedals. By configuring and orienting the footboard in this manner, a tricycle is created which is adaptable in the illustrated manner. The footboard need not be separately stored, however, since it remains on the tricycle.

In a further advantageous embodiment of the invention, it can be provided that the frame is equipped with a coupling area, wherein the footboard is equipped with a connection area, wherein the coupling area can be connected with the connection area both in the first orientation and in the second orientation of the footboard. It is advantageous to provide a specially adapted coupling and connection area. By these means attachment or detachment operations can be facilitated for the user, and errors can be avoided.

In a further advantageous embodiment of the invention, it can be provided that the frame is equipped with a coupling area, wherein the footboard is equipped with a connection area, wherein the coupling area can be received in the connection area both in the first orientation and in the second orientation of the footboard. It is advantageous to provide a specially adapted coupling and connection area already ensuring a makeshift connection, preferably an interlocking connection, between the footboard and the frame in both orientations. In both orientations, the footboard can be placed accordingly in advance and subsequently locked in place by means of the locking means.

In a further advantageous embodiment of the invention, it can be provided that the coupling area comprises two U-shaped brackets and a section of the frame, wherein the U-shaped brackets extend on opposite sides of the frame section, wherein the connection area comprises a tunnel-shaped section and a rectangular recess. Such a configuration of the coupling and connection area is suitable in an advantageous manner to enable the footboard to be mounted in the two orientations. Furthermore, the U-shaped brackets are lightweight and easy to attach on the frame, for example, by means of welding etc.

In a further advantageous embodiment of the invention it can be provided that the footboard has two stepping surfaces, wherein each of the stepping surfaces extends from opposite sides of the tunnel-shaped section. A footboard of this type enables both feet to be placed on it.

In a further advantageous embodiment of the invention, it can be provided that the stepping surfaces at least partially have a triangular configuration. A footboard of this configuration fulfills the requirements with respect to a footboard having a narrower and a broader portion overall.

In a further advantageous embodiment of the invention, it can be provided that a locking means is provided that can optionally have a first state and a second state, wherein the footboard, in the first state, is connected to the frame, and the footboard, in the second state, is removable from the frame. Such a locking means is advantageously suitable to create a releasable connection between the footboard and the frame.

In a further advantageous embodiment of the invention, it can be provided that the locking means comprises at least one slidable plate, wherein the slidable plate is displaceably received on the footboard. One or more slidable plates can thus advantageously and cheaply enable the footboard to be locked. Alternative locking means, such as rotatable or clip-type elements are also conceivable.

Further features and advantages of the present invention will be understood from the following description of preferred exemplary embodiments with reference to the accompanying drawings, wherein:

BRIEF DESCRIPTION OF THE SEVERAL VIEWS OF THE DRAWING

FIG. 9 is an enlarged view of a locking means, in particular a slidable plate (locked state).

DESCRIPTION OF THE INVENTION

Figure 1:
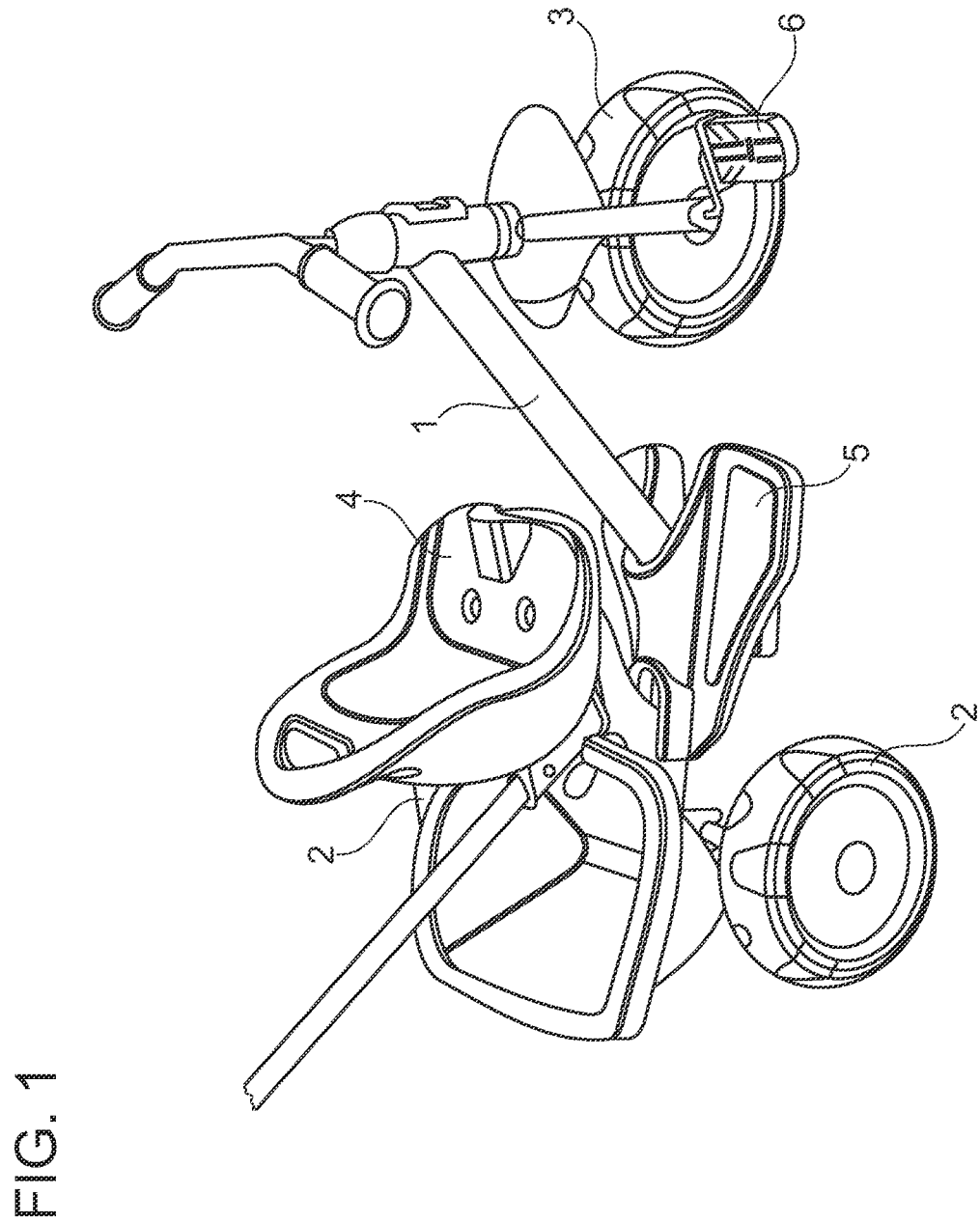
FIG. 1 shows a tricycle according to the present invention in a perspective view, having a footboard in a first orientation.

The following reference numerals will be used in the individual drawing figures:
1 frame
2 rear wheel
3 front wheel
4 seat
5 footboard
6 drive pedal
11 frame section
12 U-shaped bracket
51 tunnel-shaped section
52 rectangular recess
53 slidable plate
54 first stepping surface
55 second stepping surface First, reference is made to FIG. 1.

A tricycle according to the present invention essentially comprises a frame 1, two rear wheels 2, a steerable front wheel 3 having two drive pedals 6, and a seat 4 attached to the frame, and a footboard 5.

The configuration of a tricycle is well known to the person skilled in the art, so that only the essential aspects of the footboard will be explained here in the context of the tricycle.

The footboard 5 is essentially a molded plastic part. The footboard 5 essentially comprises a connection section, a locking means and two stepping surfaces 54, 55.

The frame 1 of the tricycle comprises a coupling area, to which the footboard 5, in particular the connection area, can be attached. Essentially the coupling area comprises a section 11 of the usually tube-like frame, and two U-shaped brackets 12 extending on opposite sides of the frame section 11. The footboard can also be indirectly fixed on the frame.

The connection area of the footboard 5 essentially comprises a tunnel-shaped section 51 and a rectangular recess 52. The connection area essentially partially corresponds to the coupling area of the frame on which the footboard 5 is to be mounted. Insofar deviating configurations are also conceivable. Preferably, the shape of the connection area is already selected in such a manner that there is an interlocking engagement between frame 1, or frame section 11, and footboard 5, whereby it is still possible, however, to remove the footboard 5 in one direction, without the locking means, or while the locking means is deactivated. Furthermore, the connection area is configured in such a manner that the footboard 5 can be connected to the coupling area both in a first orientation and in a second orientation, preferably rotated by 180°.

The locking means can preferably assume at least two states. In a first state, the locking means is adapted to lock the connection of the footboard 5 with the frame 1, or the frame section 11. In a second state, the locking means is adapted to release the connection. In a preferred embodiment, it can be provided that the locking means comprises at least one, preferably two slidable plates 53. The locking means can also be configured, for example, as a rotary element (not shown here).

Figure 7:
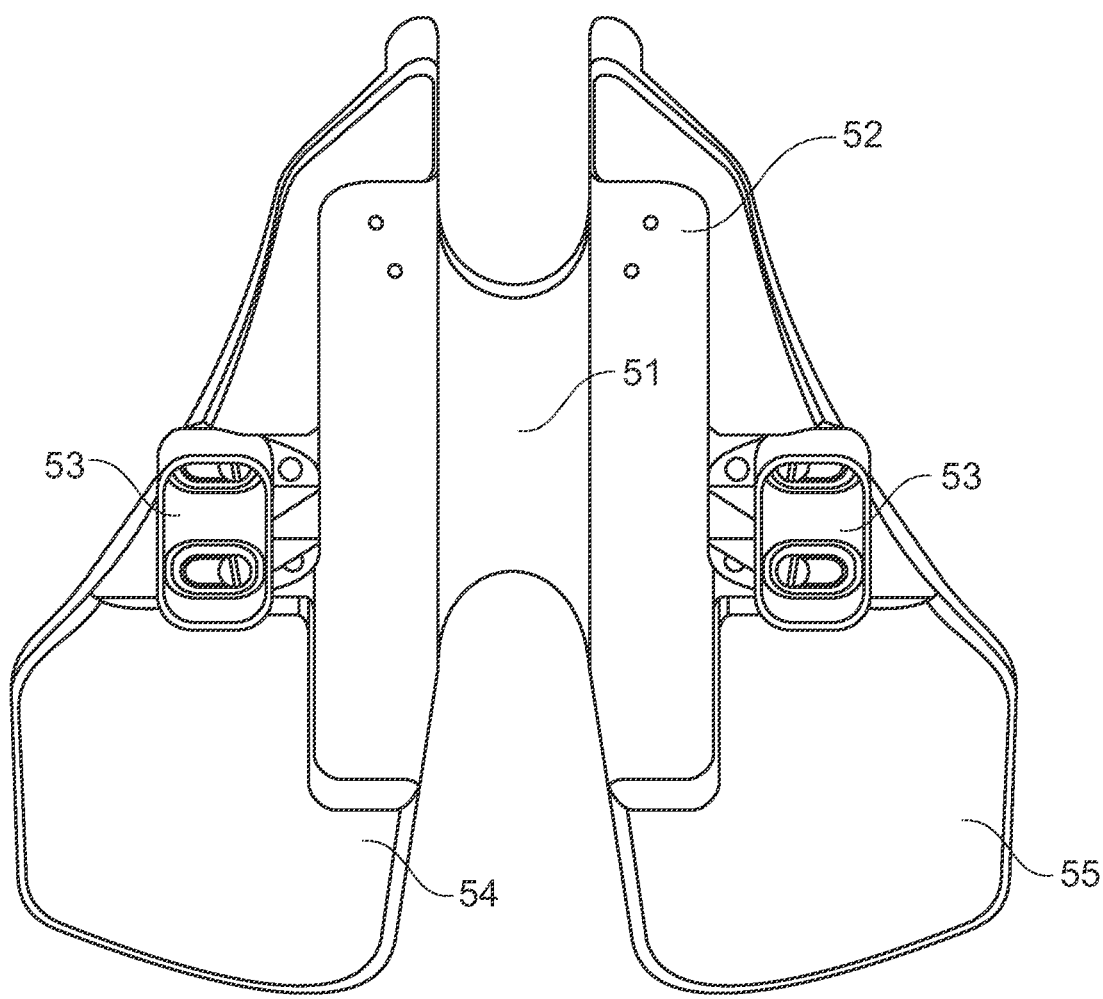
FIG. 7 is a bottom view of a footboard for a tricycle according to the present invention with the locking means unlocked.
Figure 8:
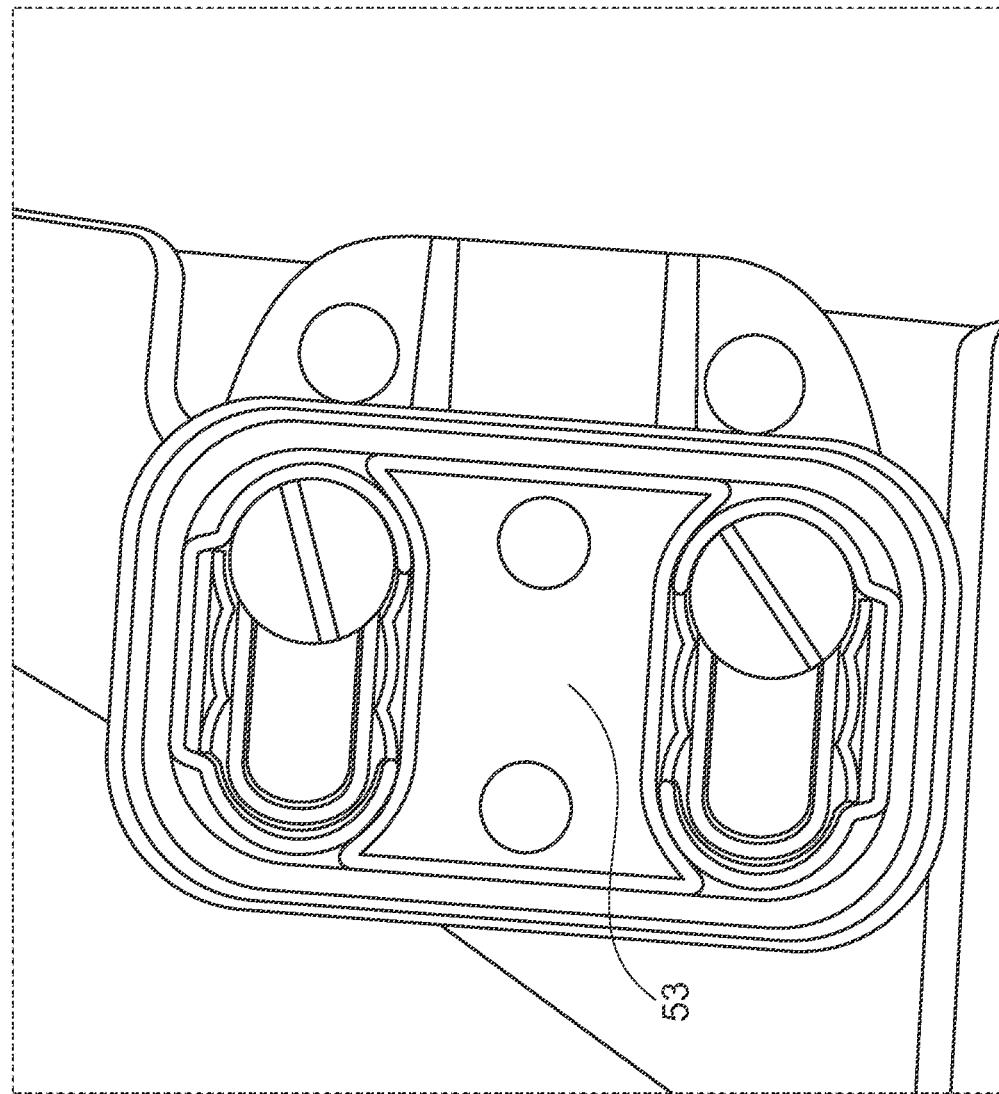
FIG. 8 is an enlarged view of a locking means, in particular a slidable plate (unlocked state)

The stepping surfaces 54, 55 each extend on either side of the tunnel-shaped section. At least one, but preferably both, stepping surfaces 54, 55 at least partially have a triangular configuration. The triangular portion can open out into a rectangular or square portion. In a plan view of the footboard 5, the overall result is thus an approximately V-shaped form of the footboard 5, or a broader and a narrower, or tapering, portion of the footboard 5. Essentially it is provided that the stepping surface has a broader and a narrower end. This feature can be easily seen in FIG. 7 for example. Further suitable shapes are also possible, however.

Further details of the tricycle according to the present invention can be derived from a functional description, in particular a respective positional change of the footboard 5 between a first orientation and a second orientation.

Figure 2:
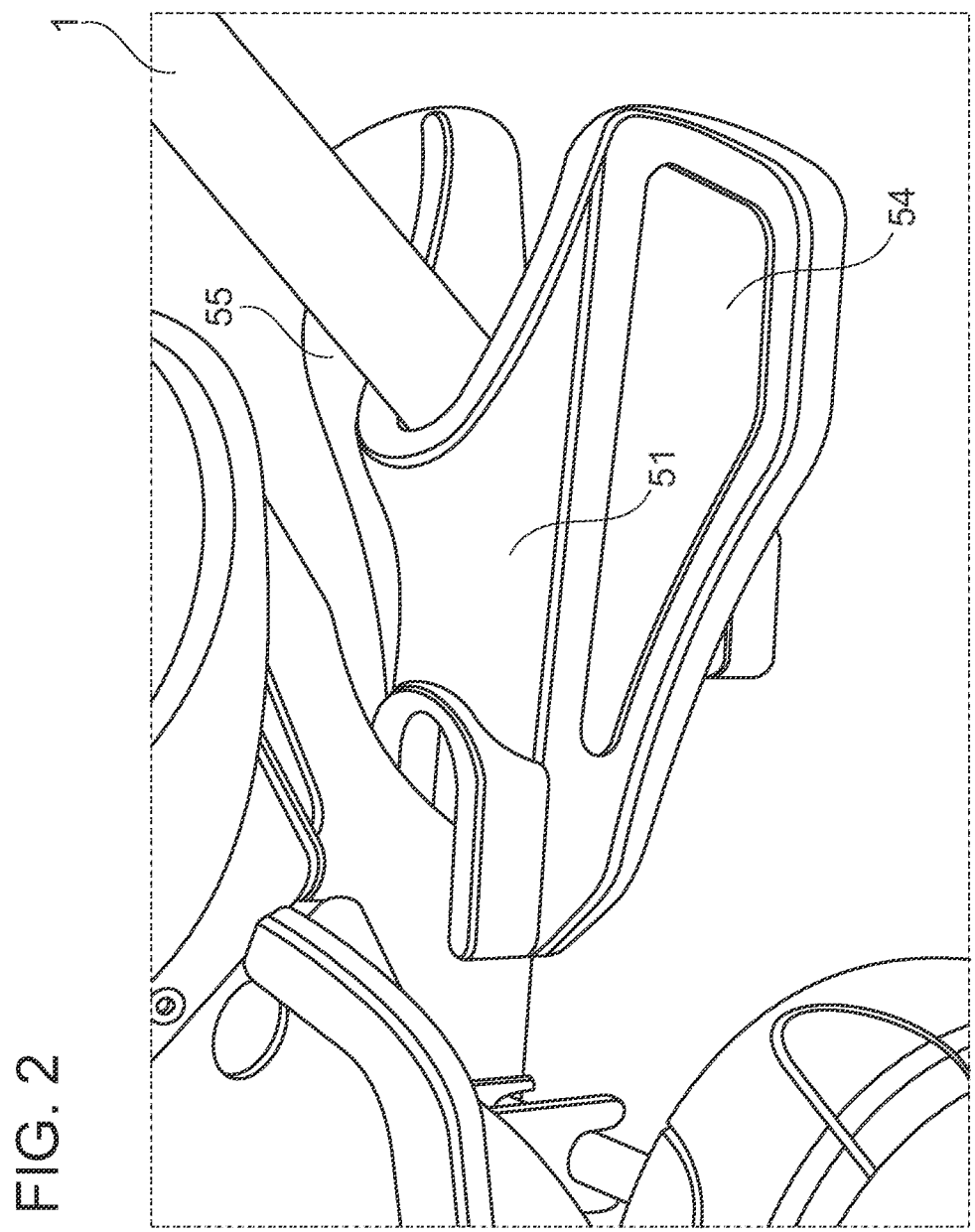
FIG. 2 shows an enlarged detail of FIG. 1.

In FIGS. 1 and 2, the footboard 5 is connected to the frame in a first orientation. The broader portion of the footboard 5 faces the drive pedals 6. In this orientation of the footboard 5, it is provided that the user places, or can place, his or her feet on the footboard 5 and does not use the drive pedals 6. The slidable plates 53 contact the frame 1, in particular the U-shaped brackets 12, and are thus in a locked state. A portion of the U-shaped bracket 12 is arranged between the footboard 5 and the slidable plate 53 so that the footboard 5 is fixed on the frame 1.

Figure 3:
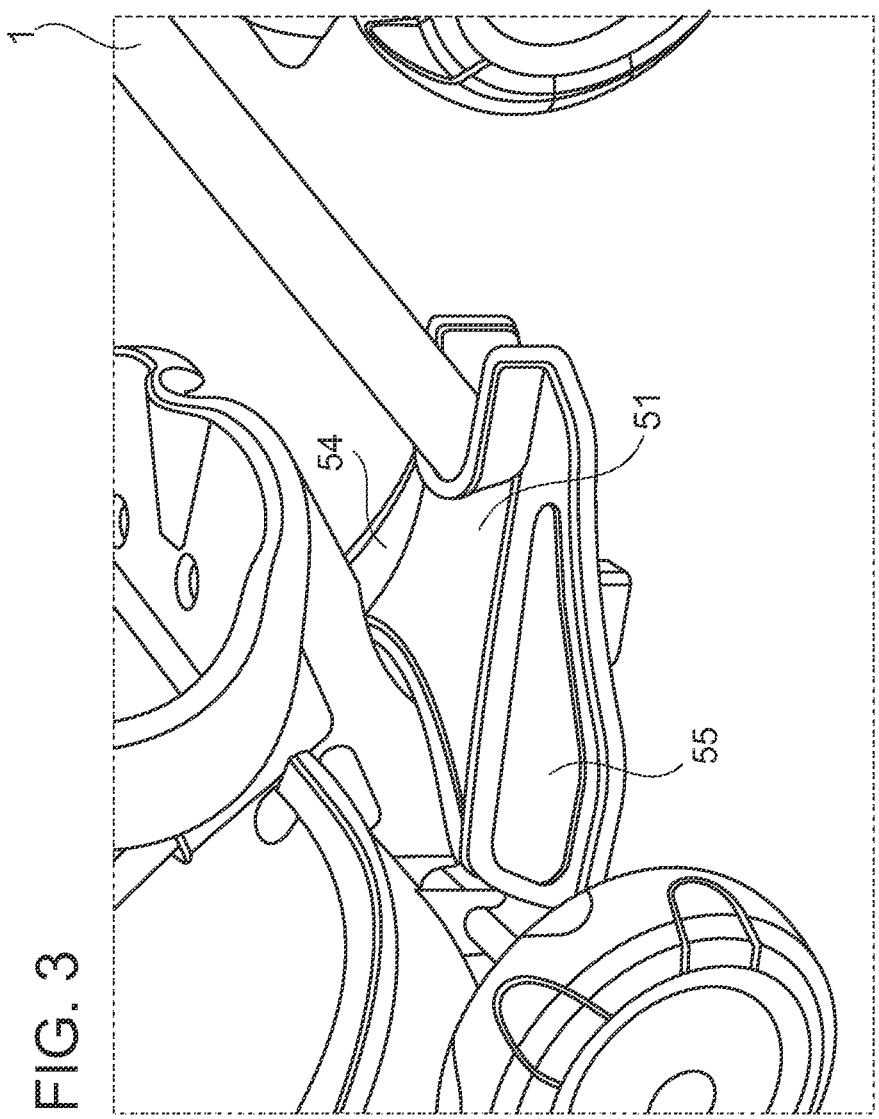
FIG. 3 shows a detail of a tricycle according to the present invention having a footboard in a second orientation.
Figure 4:
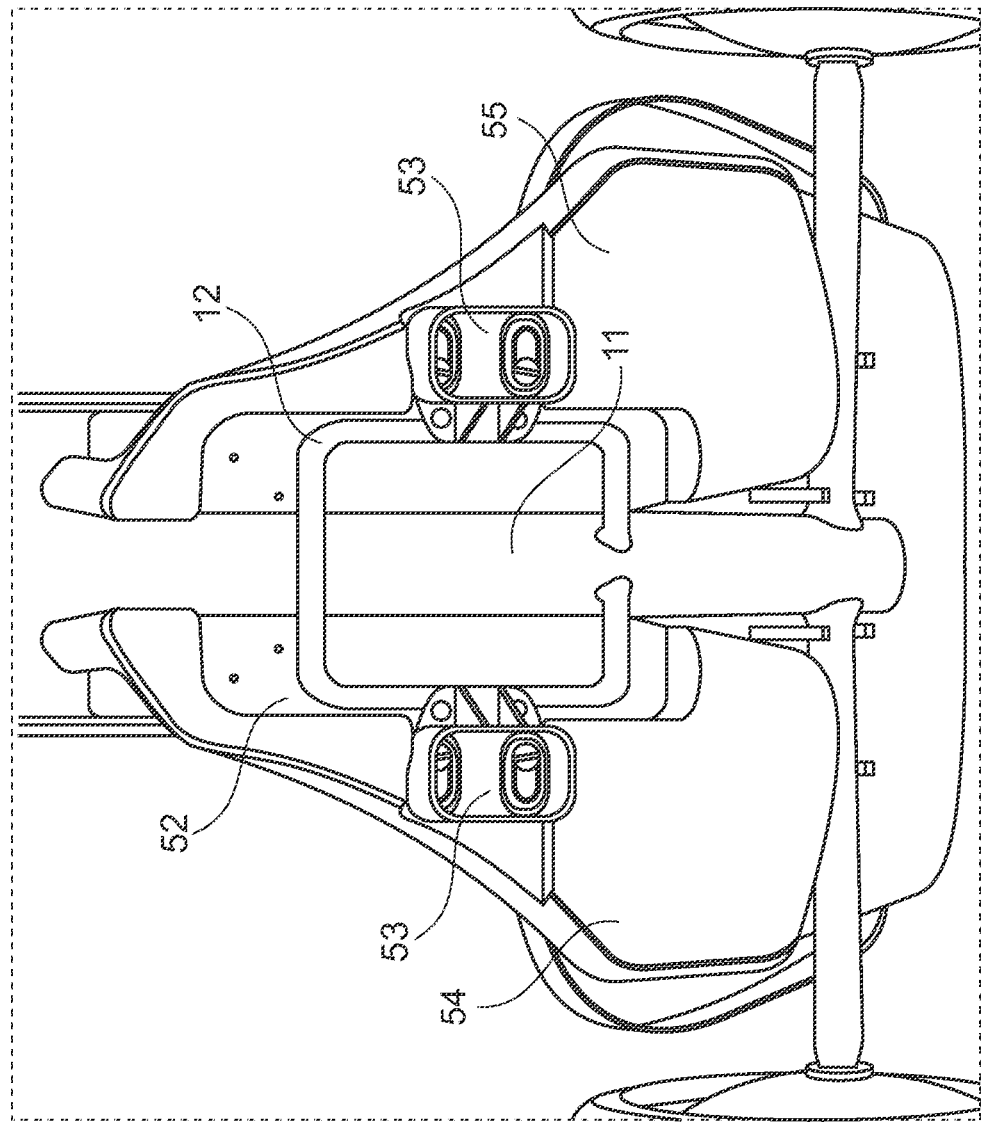
FIG. 4 shows a detail of a bottom view of a tricycle according to the present invention having a footboard in a second orientation.
Figure 5:
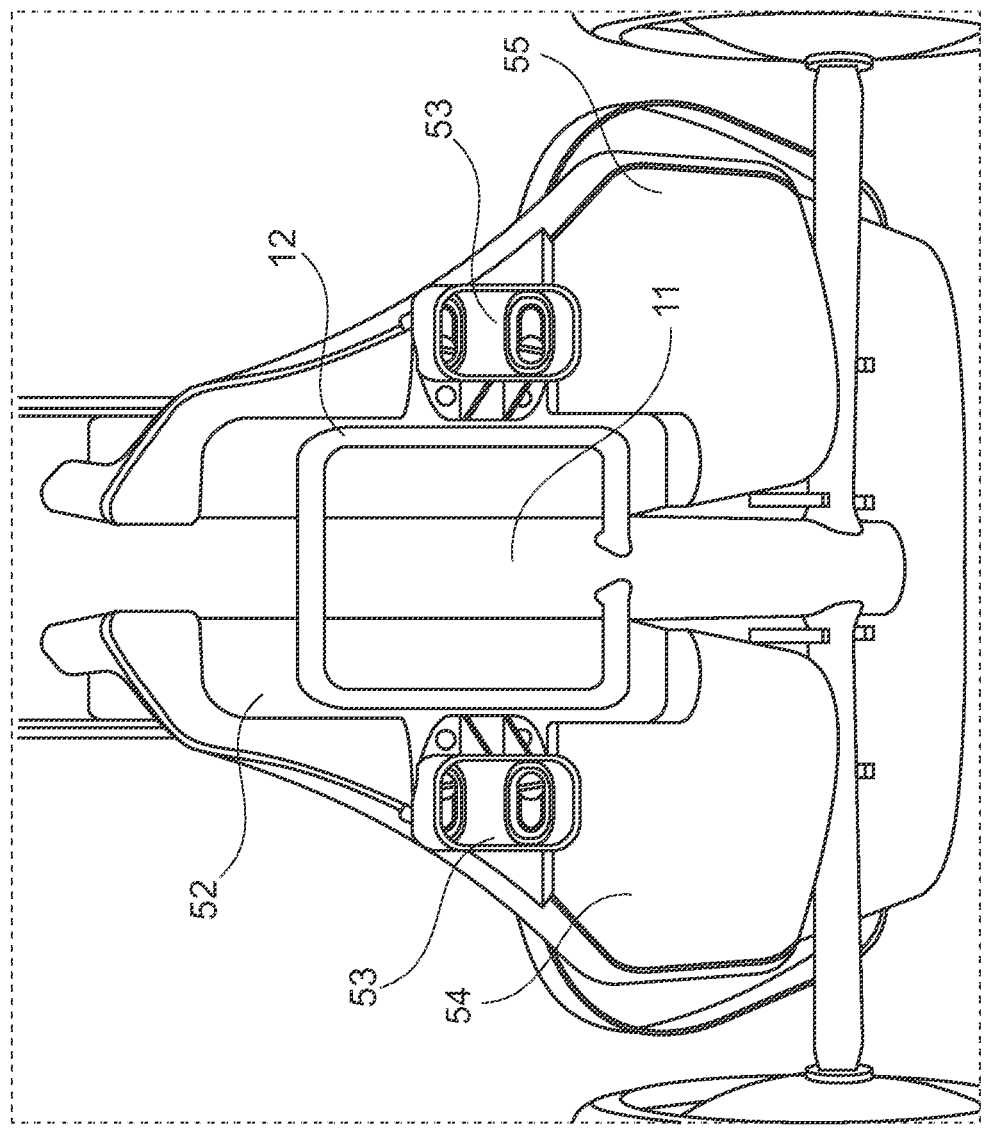
FIG. 5 shows a detail as in FIG. 4, but with an unlocked locking means.
Figure 6:
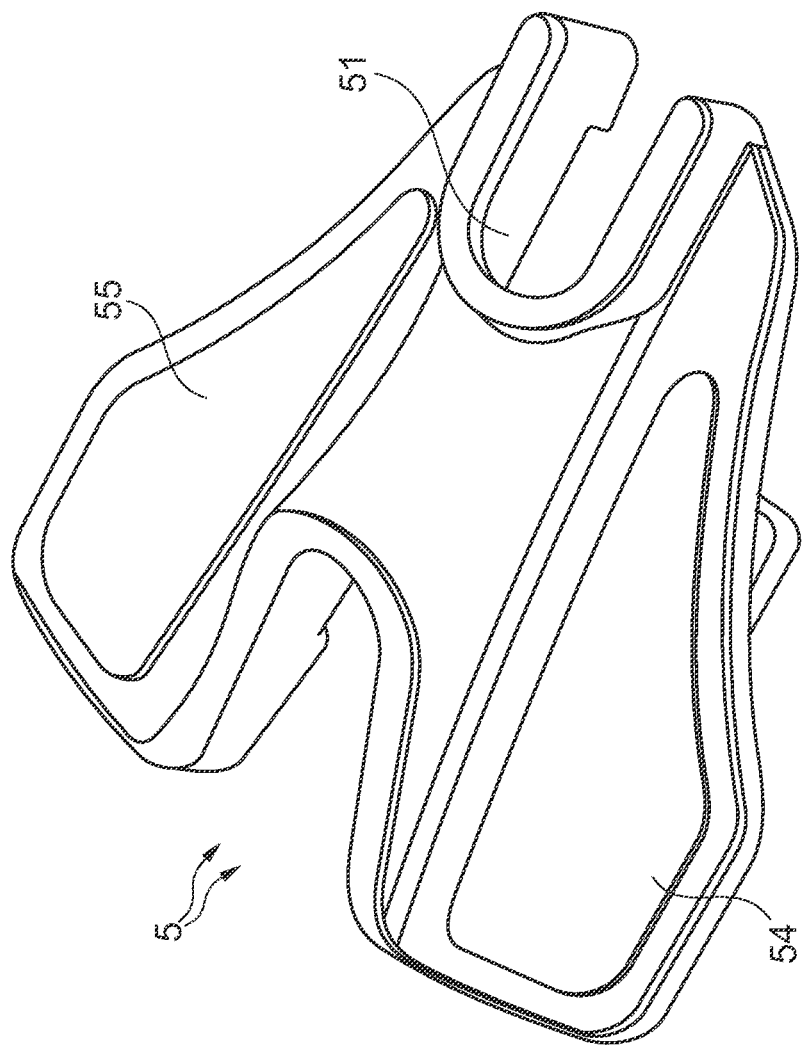
FIG. 6 is a perspective view of a footboard for a tricycle according to the present invention.

To release the footboard 5 from the frame, or to turn the footboard 5, the locking means is unlocked. For this purpose, the slidable plates 53 are moved in such a way that the U-shaped brackets 12 are no longer received between slidable plate 53 and footboard 5, or rectangular recess 52. The slidable plates 53 are thus in an unlocked state. The footboard 5 can be removed, turned, and attached again, in such a way that the narrow portion now faces in the direction towards the drive pedals. The footboard is thus turned by 180° and the connection area is placed on the coupling area again. A footboard 5 in this orientation is shown in FIG. 3.

Subsequently, the locking means is locked by pushing the slidable plates 53 back into a locked state. The footboard 5 is now connected to the frame 1 again. The narrow portion of the footboard 5 now faces the drive pedals 6. The user can now easily operate the drive pedals 6.

It is conceivable that a footboard 5 has been created that cannot be lost, that can be mounted optionally in two different orientations, and, in particular, with corresponding different functions, on the frame 1.

The invention claimed is:

1. A tricycle, comprising:
a frame, a front wheel with drive pedals, and a seat mounted to said frame;
a footboard selectively mountable to said frame in a first orientation wherein said footboard is functional as a footrest and in at least one second orientation wherein said footboard is functional as a footrest, said footboard having a relatively narrower portion and a relatively broader portion in a longitudinal direction thereof; and
said broader portion of said footboard being disposed to face towards said drive pedals in the first orientation, and said narrower portion of said footboard being disposed to face towards said drive pedals in a second orientation;
wherein said frame is formed with a coupling area, said footboard is formed with a connection area, and said coupling area is connectible with said connection area both in said first orientation and in said second orientation of said footboard, wherein said coupling area includes two U-shaped brackets and a section of said frame, said U-shaped brackets extend on opposite sides of said section of said frame, and said connection area of said footboard includes a tunnel-shaped section and a rectangular recess.

2. The tricycle according to claim 1, wherein said footboard is formed with two stepping surfaces, said stepping surfaces extending respectively from mutually opposite sides of said tunnel-shaped section.

3. The tricycle according to claim 2, wherein said stepping surfaces have an at least partially triangular configuration.

4. The tricycle according to claim 1, which comprises a locking device configured to selectively assume a first state and a second state, wherein said footboard is connected to said frame in said first state of said locking device, and said footboard is removable from said frame in said second state of said locking device.

5. The tricycle according to claim 4, wherein said locking device comprises at least one slider displaceably received on said footboard.

6. A tricycle, comprising:
   a frame, a front wheel with drive pedals, and a seat mounted to said frame;
   a footboard selectively mountable to said frame in a first orientation wherein said footboard is functional as a footrest and in at least one second orientation wherein said footboard is functional as a footrest, said footboard having a relatively narrower portion and a relatively broader portion in a longitudinal direction thereof;
   said broader portion of said footboard being disposed to face towards said drive pedals in the first orientation, and said narrower portion of said footboard being disposed to face towards said drive pedals in a second orientation;
   said frame being formed with a coupling area, said footboard being formed with a connection area, and said coupling area being receivable in said connection area both in said first orientation and in said second orientation of said footboard; and
   wherein said coupling area comprises two U-shaped brackets and a section of said frame, said U-shaped brackets extend on opposite sides of said section of said frame, and said connection area of said footboard includes a tunnel-shaped section and a rectangular recess.

7. The tricycle according to claim 6, wherein said footboard is formed with two stepping surfaces, said stepping surfaces extending respectively from mutually opposite sides of said tunnel-shaped section.

8. The tricycle according to claim 7, wherein said stepping surfaces have an at least partially triangular configuration.

9. A tricycle, comprising:
   a frame formed with a coupling area, a front wheel with drive pedals, and a seat mounted to said frame; and
   a footboard selectively mountable to said frame in a first orientation and in at least one second orientation, said footboard having a connection area to be connected to said coupling area of said frame in both said first orientation and said second orientation of said footboard;
   said coupling area including two U-shaped brackets and a section of said frame, said U-shaped brackets extending on opposite sides of said section of said frame, and said connection area of said footboard including a tunnel-shaped section and a rectangular recess.

10. The tricycle according to claim 9, wherein said footboard is formed with two stepping surfaces, said stepping surfaces extending respectively from mutually opposite sides of said tunnel-shaped section.

11. The tricycle according to claim 10, wherein said stepping surfaces have an at least partially triangular configuration.

12. A tricycle, comprising:
   a frame formed with a coupling area, a front wheel with drive pedals, and a seat mounted to said frame; and
   a footboard selectively mountable to said frame in a first orientation and in at least one second orientation, said footboard having a connection area configured to receive said coupling area both in said first orientation and in said second orientation of said footboard;
   said coupling area including two U-shaped brackets and a section of said frame, said U-shaped brackets extending on opposite sides of said section of said frame, and said connection area of said footboard including a tunnel-shaped section and a rectangular recess.

13. The tricycle according to claim 12, wherein said footboard is formed with two stepping surfaces, said stepping surfaces extending respectively from mutually opposite sides of said tunnel-shaped section.

14. The tricycle according to claim 13, wherein said stepping surfaces have an at least partially triangular configuration.

* * * * *